Oct. 19, 1937. D. B. BANKS ET AL 2,096,314
APPARATUS FOR DISLODGING FILTER CAKE FROM FILTERS
Filed Oct. 2, 1935 4 Sheets-Sheet 1

WITNESS:
Robt P Mitchel

INVENTORS
Daniel B. Banks
Paul D. Barton
BY
Busser and Harding
ATTORNEYS.

Patented Oct. 19, 1937

2,096,314

UNITED STATES PATENT OFFICE 2,096,314

APPARATUS FOR DISLODGING FILTER CAKE FROM FILTERS

Daniel B. Banks, Drexel Hill, and Paul D. Barton, Merion, Pa., assignors to Sun Oil Company, Philadelphia, Pa., a corporation of New Jersey Application October 2, 1935, Serial No. 43,170

16 Claims. (Cl. 210—200)

In an application filed by us November 26, 1934, Serial No. 754,714, we disclose a filtering apparatus which is especially adapted to filter precipitated wax from mineral oil. In that apparatus a number of annular trays are arranged, one above another, within a tower. Each tray comprises a filtering section, a wash section and a filter-cake removal section. The mixture of oil and wax is admitted to the filtering sections of the trays; and a washing liquid is admitted to the washing sections of the trays. A number of sets of filter leaves is arranged circumferentially over each tray. The sets of filter leaves are rotated together so that each set passes successively through a filtering section, a washing section and a filter-cake removing section. A vacuum is applied to the filter leaves while they are in the filtering and washing sections of the trays. When a set of filter leaves is in the filter cake removing section of a tray, gas under pressure is applied to said leaves in order to dislodge therefrom the wax that was previously deposited thereon while such leaves were passing through the filtering section of such tray.

In the apparatus of said application, a revoluble hollow vertical shaft extends along the axis of the tower. Within this shaft is a number of vertical collecting pipes, arranged around the axis of the shaft and rotating bodily with the shaft, having mechanical and fluid-channel connection with the filter leaves so that the latter rotate with the shaft and pipes and so that means are afforded for passage of filtrate and wash liquid from each set of filter leaves to a corresponding pipe and for passage of gas under pressure from each pipe to the corresponding set of filter leaves of each tray. These pipes, bodily rotatable, as stated, with the shaft, communicate, at their lower ends, with vertically extending channels formed in a valve member that rotates with the shaft. These channels may be, and substantially are, mere continuations of the pipes. They open at their lower ends through the base of the rotary valve member and are adapted, in the rotation of the valve member, to successively communicate with a filtrate outlet, a wash fluid outlet and a gas inlet or blow opening, all formed in a stationary valve member the top of which is pressed upward against the base of the rotary valve member. The two outlets named are connected with a source of vacuum. The blow opening is connected with a supply of gas under pressure.

In the operation of the apparatus only one channel of the rotary valve member is at any given time in communication with the gas blow opening of the stationary valve member. Communication begins, of course, as soon as the advance edge of a channel passes beyond the near edge of the blow opening in the stationary valve member and such communication is maintained until the rear edge of the rotating channel passes beyond the rear edge of the blow opening. The gas blowing operation, therefore, involves a gradually increasing flow of gas followed by a maximum gas flow followed by a gradually decreasing flow of gas.

While the operation is effective, with a sufficient gas pressure, to blow the filter cakes off the filter, it is open to certain serious objections. The gradual application of the gas pressure does not establish the ideal condition required to completely dislodge the wax, some of which tends to tightly adhere to the filter leaves. Further, the duration of the gas flow through each rotating channel is prolonged, and the flow through successive channels is almost continuous, since the disconnection of one rotary channel with the gas inflow is almost immediately followed by connection of the next rotary channel of the series with the gas flow. Further, the pressure of the gas must be maintained at a high value to insure the approximately complete removal of the wax cake from the filter leaves. The expense involved in an almost continuous flow of gas under high pressure is a serious factor of operating costs. In a propane dewaxing plant, the most desirable gas to use is propane and the cost of condensing the propane gas used in the cake-removing operation is very considerable.

We have discovered that the most effective way to apply the gas pressure is to apply it in the form of a sudden blast of maximum volume and short duration. The blast must, therefore, be released after the channels in the two valve members are in complete register. Such operation is not only effective to completely remove the wax cake from the filter leaves, but the volume of gas required is much reduced and the gas pressure may also be permissively reduced.

The object of our invention is to provide a reliable means to enable the gas pressure to be so applied. Another object of the invention is to provide means whereby the precise time of application of the gas pressure may be predetermined as desired and whereby, also, the duration of the gas flow may be predetermined as desired.

A preferred embodiment of the invention is shown in the accompanying drawings, wherein—

Figure 2:
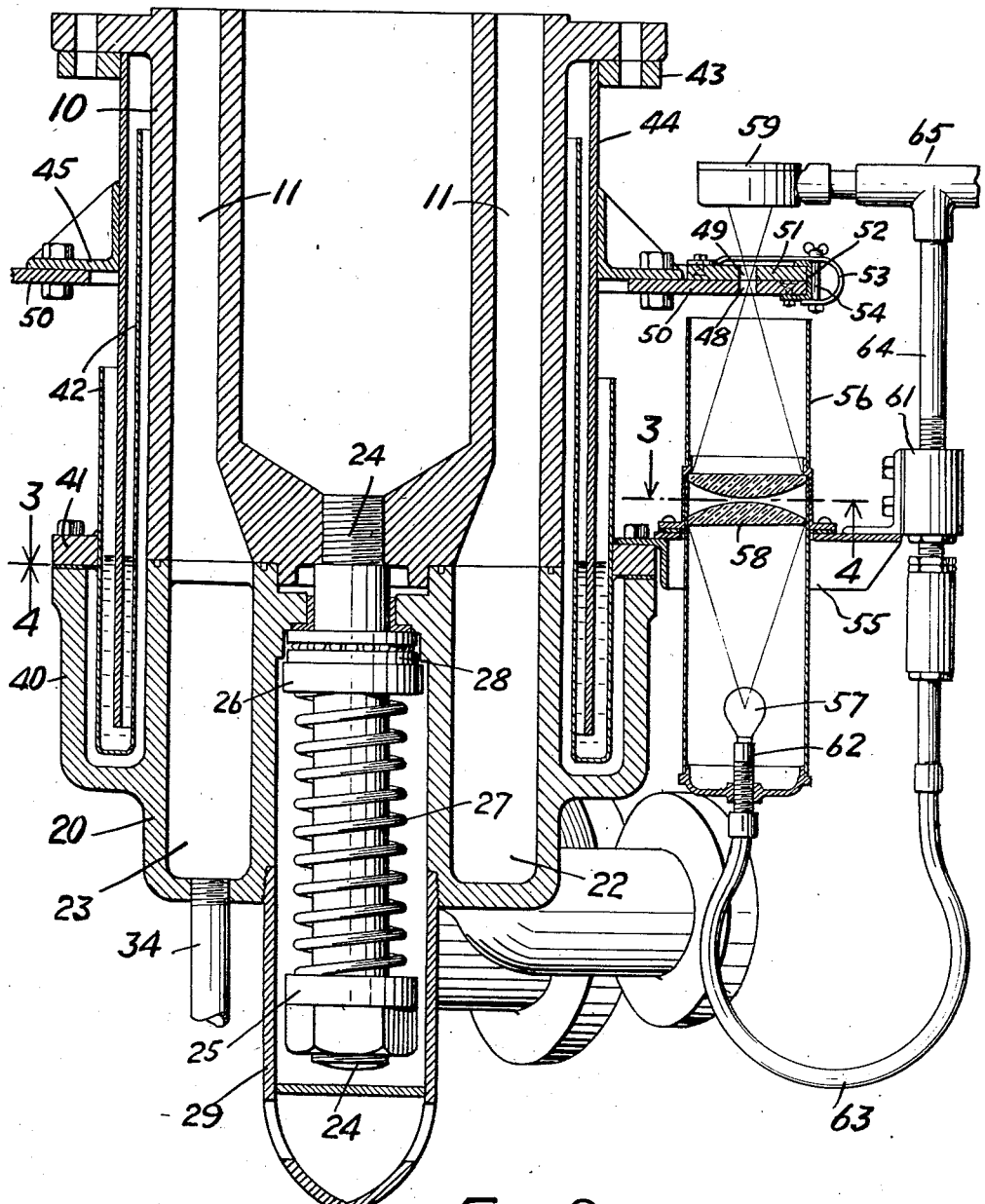
Fig. 2 is a vertical sectional view of the stationary and rotary valve members and of the "electric eye" which is operable, through means shown in Fig. 1, to control the admission of gas to the channels communicating with the filter leaves.

The rotary valve member 10 (see Fig. 2) is provided with tubular channels 11, which, at their upper ends, communicate with the pipes, carried by the central rotary shaft of the filtering apparatus, through which the filtrate and the used wash liquid are conveyed from the filter trays through the rotary filter leaves, and through which gas under pressure is blown through the rotary filter leaves to dislodge the wax therefrom. The channels 11 at their lower ends assume the shape of radial slots. The filtering elements are not shown, since they form no part of the invention.

Figure 3:
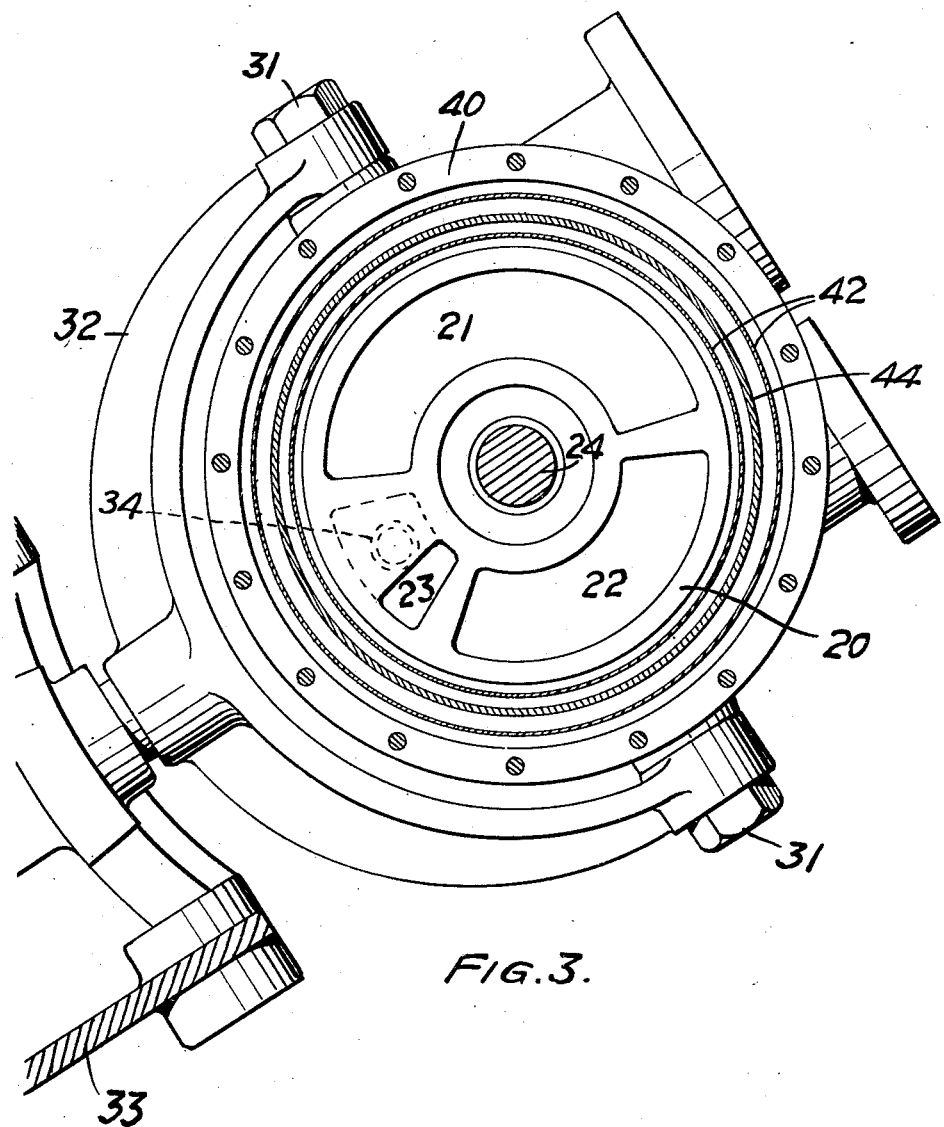
Fig. 3 is a transverse section looking in the direction of arrows 3, 3 of Fig. 2.

The stationary valve member 20 is provided with three arcuate channels, namely, a filtrate outlet 21, a wash fluid outlet 22, and a gas inlet 23, the opening of which is comparatively short, measured circumferentially (see Fig. 3), so that it cannot align, at any given point in the rotation of valve member 10, with more than one channel 11.

Depending from the base of the rotary valve member 10 is a bolt 24 having two collars 25 and 26 between which is confined a spring 27. By means of a roller bearing 28 on collar 26 the stationary valve member 20 is supported, and spring 27 operates to maintain the stationary valve member pressed against the rotary valve member. A cap 29 depending from the base of the stationary valve member excludes admission, to the space around the bolt and spring, of air which might possibly leak through the bearing to the filtrate or used wash fluid flow channels, 21 and 22.

The stationary valve member 20 is connected to the yoke 32 by pins 31, the yoke being supported from frame 33 in any suitable way that will prevent valve member 20 from turning.

Figure 1:
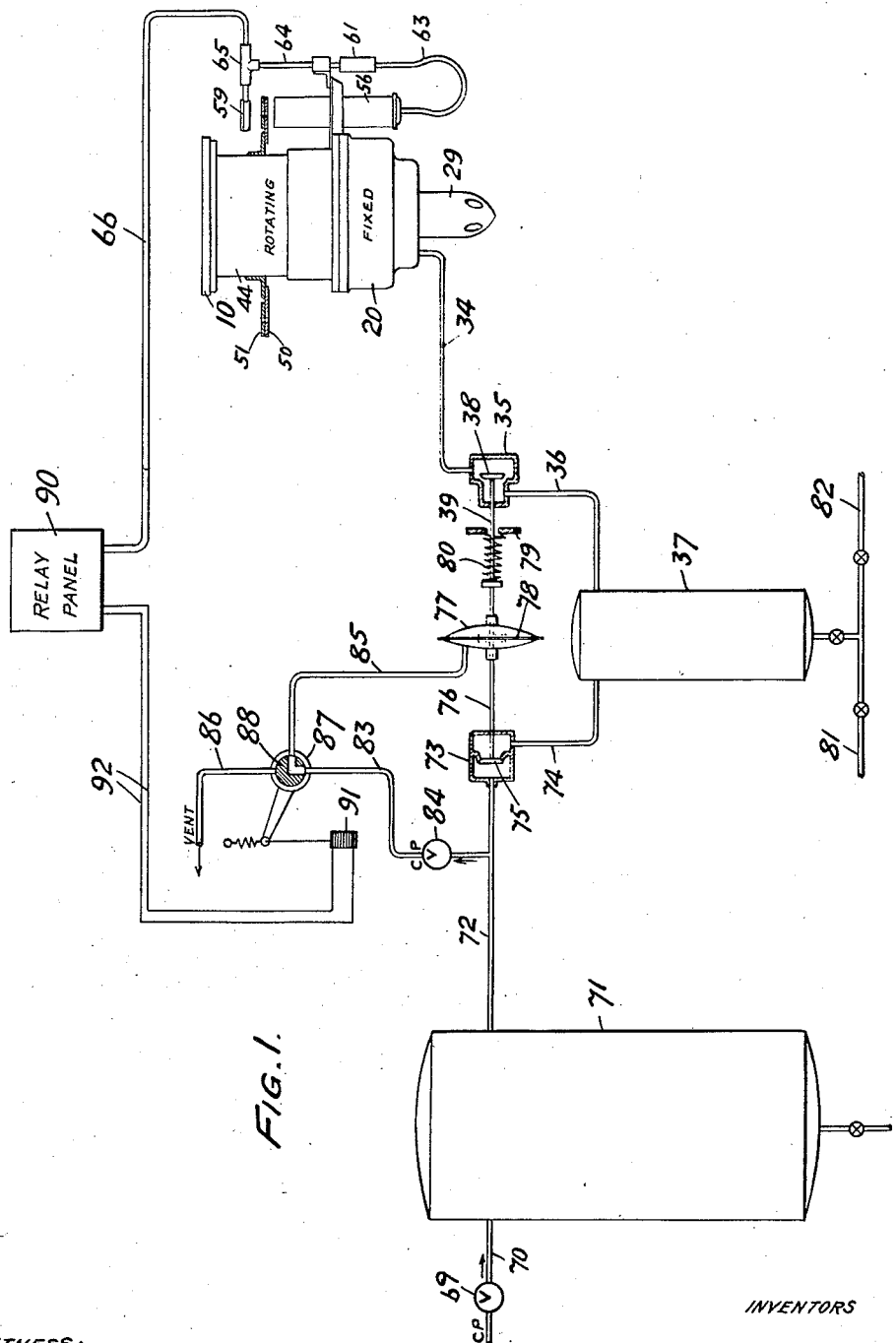
Fig. 1 is a diagrammatic view of the means for supplying successive blasts of filter cake dislodging gas.

Connected with the blow opening 23 of the stationary valve member 20 is one end of a pipe 34 whose other end (see Fig. 1) communicates with a valve chamber 35, which is connected, through a pipe 36, with a tank or chamber 37 adapted to hold, under suitable pressure, say 20 pounds gage, intermittent charges of gas, each of a volume equal to that intended to be admitted intermittently to blow opening 23 for transmission through each of the rotating channels 11 as they successively register, in the rotation of valve member 10, with blow opening 23.

While any channel 11 registers with the blow opening 23, the precise time of admission to the blow opening of the gas charge is determined by the action upon a photo-electric cell of light rays which pass through apertures which, in the rotation of the rotary elements of the filtering apparatus, are moved successively into the path of said rays; the photo-electric cell controlling the operation of electric and mechanical means, hereinafter described, for charging and discharging the tank 37.

Figure 4:
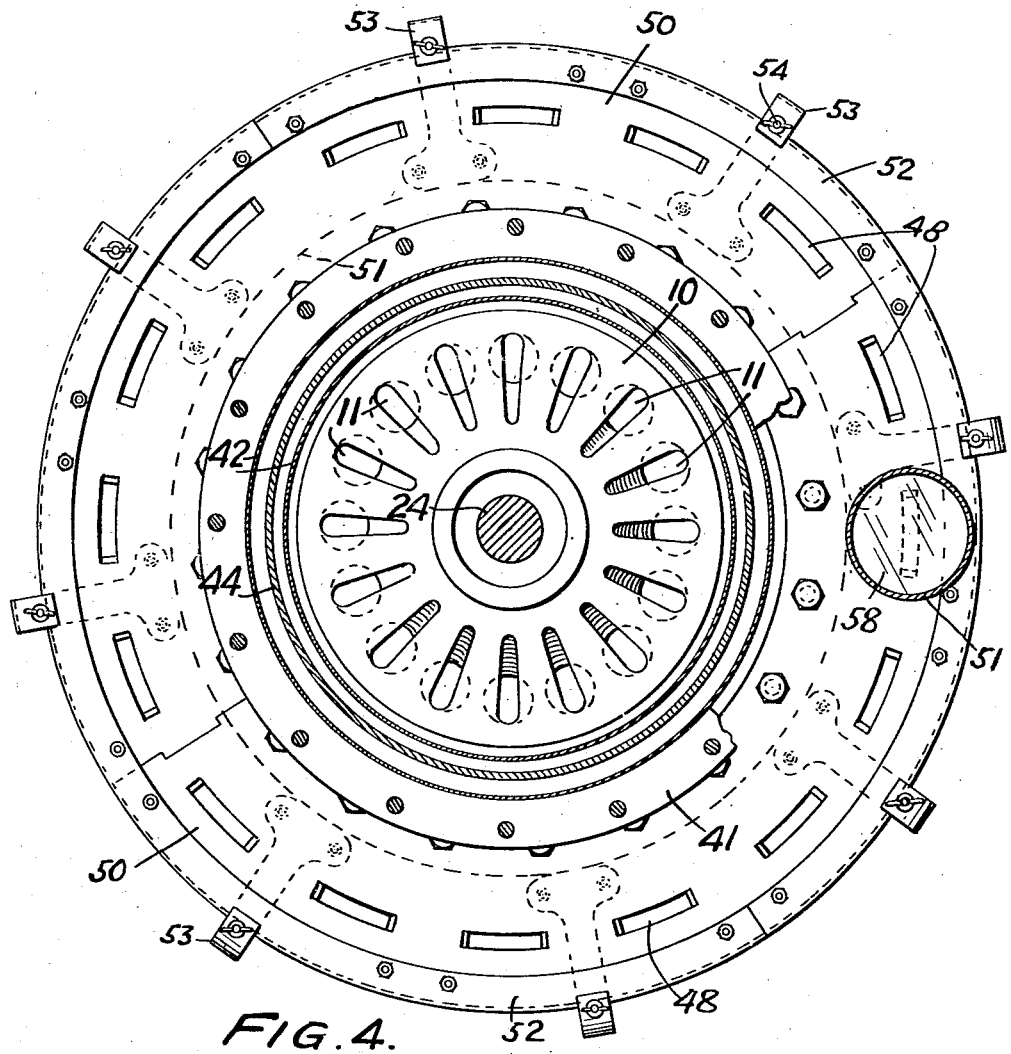
Fig. 4 is a transverse section looking in the direction of the arrows 4, 4 of Fig. 2.
Figure 5:
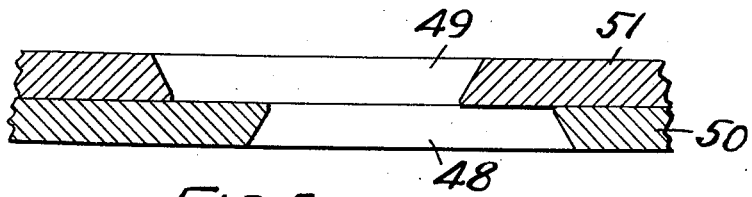
Fig. 5 is an enlarged sectional view of a short section of one of the annular rotary plates and of one of the apertures formed thereby for passage of light to the photo-electric cell.

The light apertures may be formed in any suitable devices which rotate with the rotating elements of the filter. The devices that we have devised and consider preferable will now be described (see Figs. 2, 4 and 5).

In our prior application above mentioned, we disclose a contrivance providing a mercury seal between the rotary and stationary valve members to exclude admission of air to the joint between said members, and since we mount the devices carrying the light apertures on this contrivance, it will be briefly described. Surrounding and integral with the stationary valve member 20 is a laterally and upwardly extending flange 40, to the upper edge of which is bolted a ring 41 supporting a mercury-containing J-shaped cup 42, which extends within the deep annular groove formed by the flange 40. A ring 43 is bolted to an annular flange on the rotary valve member 10 and carries a depending cylindrical sleeve 44 which extends into cup 42 nearly to its bottom and well below the bath of mercury in the cup.

Secured to sleeve 44 is an annular flange 45 to which is bolted an annular plate 50 having spaced apart arcuately extending slots 48 corresponding in number to the channels 11. Resting on the annular plate 50 is another annular plate 51 having similar arcuately extending slots 49. The upper plate 51 is circumferentially adjustable on the lower plate 50 so as to provide light apertures, of any desired dimensions, which will register with the light rays (from the lamp 57 hereinafter described) at any desired equally spaced-apart points in the rotation of the rotary elements of the filter. Plate 51 will, of course, be so adjusted that the light apertures will register with the light rays when successive channels 11 in the rotary valve member 10 register with the blow opening 23, but a finer adjustment than that is desired, since it is desirable that the blast of gas should not be admitted to the flow opening 23 and thence to a channel 11 until nearly or quite the full width of the channel is open to the blow opening. Further, it is desirable to control the instant of admission of the gas charge with even more accuracy, since with different wax-bearing oils the time and duration of the wax-expulsion gas blast should be varied. The construction above described enables this fine control and regulation to be accomplished.

The plates 50 and 51 must, of course, be held in the fixed relation to which they are adjusted. Extending around the periphery of plate 50 is a ring 52 having an inwardly extending lower flange bolted to plate 50 and an inwardly extending upper flange overhanging plate 50 and extending over and contacting with the peripheral portion of plate 51. Spring strips 53 attached to plate 51 extend over plate 51 and ring 52 and thence curve around and extend under ring 52. By means of a bolt and nut 54 each spring strip may be tightened to hold it firmly against ring 52 and thereby prevent circumferential displacement of the plate 51 upon plate 50. By unscrewing the nuts on these bolts, the pressure of the spring strips 53 upon plate 51 may be relieved sufficiently to permit such plate to be readjusted as desired. The annular flange 45, supporting plates 50 and 51, is, in effect, a split clamping ring which is held tightly about sleeve 44 by means of a clamping bolt (not shown) so that the fixed plate 50 may be adjusted with respect to sleeve 44 by loosening the clamping bolt and moving the annular flange 45 as desired.

Secured to ring 41 is a frame 55 upon which is mounted a cylinder 56 whose axis coincides with a circumferential line extending through the light apertures 48—49. Screwed into the bottom of cylinder 56 is a tube 62 carrying an incandescent lamp 57. Within and between the top and bottom of cylinder 56 are plano-convex lenses 58 which converge the light rays from the lamp to a focal point within the light apertures 48—49 as they are successively brought, in the rotation of the rotatable elements of the apparatus, into register with such rays. Above the plates 50 and 51 is positioned a photo-electric cell 59.

Carried on frame 55 is a support 61 for electric-wire conduits 63 and 64, the former having a flexible section connected with tube 62. On the top of conduit 64 is mounted a T conduit 65, one lateral arm of which carries the photo-electric cell 59, while the other arm is connected with an electric wire conduit 66 leading to a relay panel 90 (see Fig. 1). Through the conduits described extend the wires through which current is supplied from the relay panel to the photo-electric cell 59 and the lamp 57.

Connected with a source of supply of actuating fluid intended to be introduced to the tank 37 is a pipe 70 (see Fig. 1) which, through a pressure reducing valve 69, communicates with a bulk supply tank 71 which is under a suitable pressure, which should be the same as that desired to be applied to tank 37. A pipe 72 connects tanks 71 with a valve chamber 73. A pipe 74 connects valve chamber 73 with tank 37.

Within valve chamber 35 is a valve 38 having a stem 39 extending through one wall of a diaphragm chamber 77 and connected with a diaphragm 78 within chamber 77. Within valve chamber 73 is a valve 75 having a stem 76 extending through the other wall of the diaphragm chamber and connected with diaphragm 78. A spring 80 is confined between a collar on valve stem 39 and a fixed abutment 79. When the pressure is balanced on opposite sides of diaphragm 78, spring 80 holds valve 38 closed and valve 75 open, allowing a charge of gas to enter tank 37. The capacity of this tank, and, therefore, the volume of gas admitted thereto, is determined by admitting a predetermined volume of a suitable liquid into the tank through an inlet pipe 81. The gas capacity of the tank may be reduced by admitting more liquid to tank 37 and may be increased by drawing off liquid through pipe 82.

A three-way valve chamber 87 has a pipe connection 83 with pipe 72, a pipe connection 85 with diaphragm chamber 77, and a vent pipe 86 which may open to the atmosphere. On pipe 83 is a pressure reducing valve 84. In valve chamber 87 is a valve 88 having an arm which is actuated by a solenoid 91 which is electrically connected through wires 92 with the relay panel 90.

The relay panel 90 is of conventional type and need not be described. When the photo-electric cell 59 is activated by the impingement thereon of the light rays from lamp 57 passing through a light aperture 48, 49 in plates 50, 51, the circuit through solenoid 91 is closed, thereby turning valve 88 into the position shown in Fig. 1. This connects pipes 83 and 85 and the pressure of the gas thereby admitted to pipe 85 and the diaphragm chamber flexes diaphragm 78 to the right (Fig. 1) against the action of spring 80, thereby closing valve 75 and opening valve 38 as shown. The charge of gas in tank 37 then immediately discharges through pipes 36 and 34 into the blow opening 23 of the stationary valve member and thence into the aligning channel 11 of the rotary valve member 10. Thence the charge of gas is blown through the filter leaves (not shown) that are in open communication with channels 11 and the wax dislodged therefrom.

From the foregoing description, it will be understood that the charge of gas is not transmitted gradually to the filter leaves as the mouth of a channel 11, in the rotation of the rotatable elements of the apparatus, starts to overlap the edge of the blow opening 23, and the charge is not gradually cut off as the mouth of the channel is gradually closed. On the contrary, no gas is admitted to blow opening 23 until a predetermined time after a channel 11 starts to register with the blow opening and, ordinarily, not until after said channel is open to said blow opening to the full extent of its arcuate width. A gas blast of maximum volume will therefore be delivered to the filter leaves suddenly and with maximum force, thereby insuring the complete dislodgment of the wax from the filter leaves. Not only is the wax-dislodging power of the gas thus greatly increased, but the amount of gas required may be materially reduced. In the prior apparatus the gas pressure was required to be high and the rate of flow rapid during the entire time that a channel 11 was open to blow opening 23 and therefore involved the consumption of a quantity of gas materially greater than that required in the present apparatus.

As soon as an aperture 48, 49 passes beyond the point of impingement of the light rays, the photo-electric cell is rendered inactive and the circuit through solenoid 91 is opened, and valve 88 is turned to disconnect pipes 83 and 85 and connect pipe 85 with vent 86. Thereby the pressure on opposite sides of the diaphragm 78 is again balanced and spring 80 operates to close valve 38 and open valve 75. The opening of valve 75 allows another charge of gas to flow from bulk tank 71 to tank 37, which is released immediately after the next aperture 48, 49 moves into position to allow the light from lamp 57 to again impinge upon the photo-electric cell 59.

What we claim and desire to protect by Letters Patent is:

1. The combination with a filter of a rotary valve having a rotating member and a substantially stationary member, said rotating member having an opening communicating with the filter, said stationary member having a blow opening with which said opening in said rotating member during its rotation is adapted to register, a gas supply, a gas flow passage between the gas supply and the blow opening, means to open the gas flow passage, and cooperating means on said rotating member and said stationary member adapted at a predetermined point in the rotation of said rotating member and while its opening is in registry with said blow opening to operate the gas flow opening means.

2. In a filtering apparatus in which gas under pressure is admitted through a traveling member having a channel communicating with a filter to effect dislodgment therefrom of a filter cake, the combination, with said channel member, of a relatively fixed member having a blow opening with which the mouth of said channel during its travel is adapted to register, a gas supply, a photo-electric cell, means controlled by the photo-electric cell to open said blow opening to the gas supply, and means adapted, in the travel of said member and while its channel is in registry with said blow opening, to activate said cell at a predetermined point in the travel of said member, whereby the time of admission of gas to said channel may be controlled.

3. In a filtering apparatus in which gas under pressure is admitted through a traveling member having a channel communicating with a filter to effect dislodgment therefrom of a filter cake, the combination, with said channel member, of a relatively fixed member having a blow opening with which the mouth of said channel during its travel is adapted to register, a gas supply, a photo-electric cell, means controlled by the photo-electric cell to open said blow opening to the gas supply, a source of light and a plate traveling coordinately with said channel member and having an aperture through which, in the course of travel of said plate, and while said channel is in registry with the blow opening, light from said source is adapted to impinge upon said cell, whereby the time of admission of said gas to said channel may be controlled.

4. In a filtering apparatus in which gas under pressure is admitted through a traveling member having a channel communicating with a filter to effect dislodgment therefrom of a filter cake, the combination, with said channel member, of a relatively fixed member having a blow opening with which the mouth of said channel during its travel is adapted to register, a gas supply, a photo-electric cell, means controlled by the photo-electric cell to open said blow opening to the gas supply, a source of light, plates traveling coordinately with said channel member having light apertures through which, while said channel is in registry with the blow opening, light from said source is adapted to impinge upon said cell, said plates being relatively adjustable to vary the position in said plate of the effective light opening provided by said apertures.

5. In a filtering apparatus in which gas under pressure is successively admitted through a number of rotating channels communicating with filters to effect dislodgment therefrom of filter cakes, the combination, with said rotatable channels, of a relatively fixed member having a blow opening with which the mouths of said channels, during their rotation, successively register, a gas supply, a photo-electric cell, a light source, means controlled by the photo-electric cell to open said blow opening to the gas supply, an annular plate surrounding said channels and rotatable therewith and having apertures, corresponding in number to the channels, through which, in the course of its rotation, and while successive channels register with the blow opening, light from said source is adapted to impinge upon said cell.

6. In a filtering apparatus in which gas under pressure is admitted through a traveling member having a channel communicating with a filter to effect dislodgment therefrom of a filter cake, the combination, with said channel member, of a relatively fixed member having a blow opening with which the mouth of said channel during its travel is adapted to register, a gas tank, a pipe through which gas is adapted to be conveyed from said tank to said blow opening, and means, operating coordinately with the traveling element, adapted while said channel mouth is not in register with said blow opening, to convey predetermined charges of gas to said tank and adapted, while said channel is in registry with said blow opening and at a predetermined point in its travel, to open communication through said pipe between said tank and the blow opening.

7. In a filtering apparatus in which gas under pressure is admitted through a traveling member having a channel communicating with a filter to effect dislodgment therefrom of a filter cake, the combination, with said channel member, of a relatively fixed member having a blow opening with which the mouth of said channel during its travel is adapted to register, a gas tank adapted to receive, hold and discharge successive charges of gas to said blow opening, means, including a source of light and a photo-electric cell, controlling the discharge of gas from the tank to the blow opening, and means moving coordinately with the traveling channel adapted, while said channel is in registry with said blow opening and at a predetermined point in its travel, to expose said cell to the light from said source.

8. In a filtering apparatus in which gas under pressure is admitted through a traveling member having a channel communicating with a filter to effect dislodgment therefrom of a filter cake, the combination, with said channel member of a relatively fixed member having a blow opening with which the mouth of said channel during its travel is adapted to register, a gas tank adapted to receive, hold and discharge successive charges of gas, a gas outflow passage from said tank to the blow opening, a gas reservoir, a gas inflow passage to said tank from said reservoir, means to open the first gas outflow passage and close the gas inflow passage and alternately therewith to open the gas inflow passage and close the gas outflow passage, devices controlling the operation of said means, and means moving coordinately with the traveling channel adapted to control the operation of said devices at predetermined points in the movement of said traveling channel.

9. In a filtering apparatus in which gas under pressure is admitted through a traveling member having a channel communicating with a filter to effect dislodgment therefrom of a filter cake, the combination, with said channel member, of a relatively fixed member having a blow opening with which the mouth of said channel during its travel is adapted to register, a gas tank adapted to receive, hold and discharge successive charges of gas, a gas outflow passage from said tank to the blow opening, a gas reservoir, a gas inflow passage to said tank from said reservoir, valves controlling the respective passages, means tending to open the valve in the second passage and close the valve in the first passage, a pressure actuable device adapted when actuated to open the valve in the first passage and close the valve in the second passage, a third passage communicating with said gas reservoir and said pressure actuable device, a valve in the third passage adapted in one position to open the passage to allow pressure to be transmitted to said device and in another position to relieve said pressure, means controlling the last named valve, and means moving coordinately with the traveling channel adapted, at predetermined points in the travel of said channel, to control the operation of said valve-controlling means.

10. In a filtering apparatus in which gas under pressure is admitted through a traveling member having a channel communicating with a filter to effect dislodgment therefrom of a filter cake, the combination, with said channel member, of a relatively fixed member having a blow opening with which the mouth of said channel during its travel is adapted to register, a gas tank adapted to receive, hold and discharge successive charges of gas, a gas outflow passage from said tank to the blow opening, a gas reservoir, a gas inflow passage to said tank from said reservoir, valves controlling the respective passages, means to open one valve and close the other and alternately therewith to open the second valve and close the first valve, devices, including a photo-electric cell, adapted to control the operation of said valve-operating means, and means adapted, in the travel of the channel member and while it is in registry with said blow opening, to activate said cell at a predetermined point in the travel of said member.

11. In a filtering apparatus in which gas under pressure is successively admitted through a number of rotating channels communicating with filters to effect dislodgment therefrom of filter cakes, the combination, with said rotatable channels, of a relatively fixed member having a blow opening with which the mouths of said channels, during their rotation, successively register, a gas supply, a passage between the gas supply and the blow opening, a stationary photo-electric cell, a stationary light source, means controlled by the photo-electric cell adapted to control the closing and opening of said passage, an annular plate surrounding said channels and rotatable therewith and having spaced apart apertures, corresponding in number to said channels, arranged in a circumferential line intersecting the light rays from the light source to the photo-electric cell, whereby, in the rotation of said plate, said photoelectric cell is rendered alternately active and inactive at predetermined points in the rotation of said channels.

12. In a filtering apparatus in which gas under pressure is successively admitted through a number of rotating channels communicating with filters to effect dislodgment therefrom of filter cakes, the combination, with said rotatable channels, of a relatively fixed member having a blow opening with which the mouths of said channels, during their rotation, successively register, a gas supply, a photo-electric cell, a light source, means controlled by the photo-electric cell to open said blow opening to the gas supply, two annular plates surrounding said channels and rotatable therewith, said plates each having light apertures, corresponding in number to the number of rotating channels, through which, in the course of their rotation, light from said source is adapted to impinge upon said cell, said plates being circumferentially adjustable, one relatively to the other, to predetermine the points in their rotation whereat the photo-electric cell is actuated by the light from said source.

13. In a filtering apparatus in which gas under pressure is admitted through a traveling member having a channel communicating with a filter to effect dislodgment therefrom of a filter cake, the combination, with said channel member, of a relatively fixed member having a blow opening with which the mouth of said channel during its travel is adapted to register, a gas supply, a photo-electric cell, means controlled by the photo-electric cell to open said blow opening to the gas supply, a source of light, plates traveling coordinately with said channel member having light apertures through which, while said channel is in registry with the blow opening, light from said source is adapted to impinge upon said cell, said plates being relatively adjustable to vary the position in said plate of the effective light opening provided by said apertures, and spring clips engaging said plates and adapted to be loosened to permit said adjustment and to be made and tightened to hold the plates in their adjusted position.

14. In a filtering apparatus in which gas under pressure is admitted through a traveling member having a channel communicating with a filter to effect dislodgment therefrom of a filter cake, the combination, with said channel member, of a relatively fixed member having a blow opening with which the mouth of said channel during its travel is adapted to register, a gas tank adapted to receive, hold and discharge, to said blow opening, successive charges of gas, a gas reservoir from which successive charges of gas are supplied to said tank, and means to connect said gas tank alternately with said reservoir and said blow opening.

15. In a filtering apparatus in which gas under pressure is admitted through a traveling member having a channel communicating with a filter to effect dislodgment therefrom of a filter cake, the combination, with said channel member, of a relatively fixed member having a blow opening with which the mouth of said channel during its travel is adapted to register, a gas tank adapted to receive, hold and discharge, to said blow opening, successive charges of gas, a gas reservoir from which successive charges of gas are supplied to said tank, means adapted to connect said gas tank alternately with said reservoir and said blow opening, and means moving coordinately with the traveling channel and adapted, at predetermined points in its travel, to render the first named means operative to effect said alternate operation.

16. In a filtering apparatus in which gas under pressure is admitted through a traveling member having a channel communicating with a filter to effect dislodgment therefrom of a filter cake, the combination, with said channel member, of a relatively fixed member having a blow opening with which the mouth of said channel during its travel is adapted to register, a gas tank adapted to receive, hold and discharge to said blow opening, successive charges of gas, a gas reservoir from which successive charges of gas are supplied to said tank, means, including a photo-electric cell, a source of light, and mechanism controlled thereby, adapted to connect said gas tank alternately with said reservoir and said blow opening, and means, moving coordinately with the traveling channel and adapted, at predetermined points in its travel, to render said photo-electric cell alternately active and inactive and thereby effect said alternate operation.

DANIEL B. BANKS.
PAUL D. BARTON.